(12) United States Patent
Acheatel et al.

(10) Patent No.: US 11,455,342 B2
(45) Date of Patent: Sep. 27, 2022

(54) SYSTEMS AND METHODS FOR SERVICE OPPORTUNITY MANAGEMENT AND VOLUNTEER MANAGEMENT

(71) Applicant: Deedia Inc., Ashland, OR (US)

(72) Inventors: Gary David Acheatel, Ashland, OR (US); Jack Willem Stull, Ashland, OR (US); Mark Grant Soloway, Orinda, CA (US)

( * ) Notice: Subject to any disclaimer, the term of this patent is extended or adjusted under 35 U.S.C. 154(b) by 426 days.

(21) Appl. No.: 16/671,092

(22) Filed: Oct. 31, 2019

(65) Prior Publication Data

US 2020/0142931 A1    May 7, 2020

Related U.S. Application Data

(60) Provisional application No. 62/753,773, filed on Oct. 31, 2018.

(51) Int. Cl.
| | |
|---|---|
| *G06F 16/00* | (2019.01) |
| *G06F 16/9035* | (2019.01) |
| *G06F 16/9038* | (2019.01) |
| *G06Q 30/02* | (2012.01) |
| *G06Q 50/22* | (2018.01) |
| *G06Q 10/10* | (2012.01) |
| *G06F 16/245* | (2019.01) |

(52) U.S. Cl.
CPC ........ *G06F 16/9035* (2019.01); *G06F 16/245* (2019.01); *G06F 16/9038* (2019.01); *G06Q 10/1097* (2013.01); *G06Q 30/0279* (2013.01); *G06Q 50/22* (2013.01)

(58) Field of Classification Search
CPC .................................................... G06F 16/245
See application file for complete search history.

(56) References Cited

U.S. PATENT DOCUMENTS

2011/0295749 A1* 12/2011 Scalisi ................... G06Q 20/10
455/466
2021/0049654 A1* 2/2021 Tietzen ................... G06Q 30/02

* cited by examiner

*Primary Examiner* — Ajith Jacob
(74) *Attorney, Agent, or Firm* — Ahmann Kloke LLP

(57) ABSTRACT

An example method comprising receiving volunteer information, receiving service opportunity information, generate a query based on at least some of the volunteer information to identify one or more service opportunities, searching, using the query based on at least some of the volunteer information, to identify the one or more service opportunities from the service opportunity information, providing a first list of service opportunities based on the one or more service opportunities that were identified based on the search, receiving a selection of a service opportunity from the list of service opportunities, scheduling a volunteer associated with the volunteer system for service associated with the selected service opportunity, notifying at least one of the unrelated service opportunity systems associated with the selected service opportunity, receiving an indication of completion of the selected service opportunity and an indication of the volunteer's participation in the selected service opportunity, and updating a volunteer record.

20 Claims, 7 Drawing Sheets

SYSTEMS AND METHODS FOR SERVICE OPPORTUNITY MANAGEMENT AND VOLUNTEER MANAGEMENT

RELATED APPLICATION(S)

The present application claims the benefit of U.S. Provisional Patent Application No. 62/753,773 filed Oct. 31, 2018, and entitled "Systems and Methods for Management of Charitable and Beneficial Commitments of Three or More Parties, Consisting of at least one Charity or Individual with Needs, at least one Volunteer, and at Least one Sponsor, in at least one Agreement" which is incorporated by reference herein.

FIELD OF THE INVENTION

Embodiments of the present invention(s) relate generally to a platform which allows a sponsor to sponsor charitable works and volunteers to find and work in sponsored charitable works.

BACKGROUND

An increasing number of organizations and corporations wish to encourage and promote charitable acts. The organizations and corporations may wish to encourage and promote charitable acts as a way to give back to the community and/or encourage the public or their members/employees to engage with those in need.

Many organizations and corporations actively encourage their members to engage in service work or charitable giving. In some cases, organizations and corporations may contribute or match gifts of their members/employees and/or members of the public.

Because these are acts of charity and may be outside their core business, organizations and corporations may be unable to assist their members/employees to identify volunteer opportunities that fit needs or match skills. Further, it is generally easier for an organization or corporation to match donations to one or two charities over years.

While organization and corporation charitable giving have made a significant different in the lives of some of those in need, a more flexible solution that assists individual and groups of volunteers to engage with specific needs may assist in a dramatic increase in service work and charitable giving.

SUMMARY

An example nontransitory computer readable medium may comprise instructions executable by a processor. The instructions may be executable to perform a method. The method may comprise receiving, from a volunteer system, volunteer information, receiving from a plurality of unrelated service opportunity systems service opportunity information regarding a plurality of upcoming service opportunities, the plurality of unrelated service opportunity systems being remote from each other and the volunteer system, generating a query based on at least some of the volunteer information to identify one or more service opportunities from the service opportunity information, searching, using the query based on at least some of the volunteer information, to identify the one or more service opportunities from the service opportunity information, providing, to the volunteer system, a first list of service opportunities based on the one or more service opportunities that were identified based on the search, receiving, from the volunteer system, a selection of a service opportunity from the list of service opportunities, scheduling a volunteer associated with the volunteer system for service associated with the selected service opportunity, notifying at least one of the unrelated service opportunity systems associated with the selected service opportunity, receiving an indication of completion of the selected service opportunity and an indication of the volunteer's participation in the selected service opportunity, and updating a volunteer record associated with the volunteer.

The method may further comprise receiving a search query from a first sponsor system associated with a first sponsor, searching the information regarding a plurality of upcoming service opportunities based on the search query from the first sponsor system, providing to the first sponsor system a second list of service opportunities based on the one or more service opportunities that were identified based on the search, receiving, from the first sponsor system, a selection of the service opportunity from the list of service opportunities, receiving first sponsor conditions that trigger a donation based on the selected service opportunity, receiving an indication of completion of the selected service opportunity, and providing an indication of the donation based on performance associated with the selected service opportunity to the first sponsor system. The method may further comprise receiving funds from the first sponsor system and paying the donation to a third-party remote from the first sponsor system and the volunteer system based on completion or partial completion of the selected service opportunity. The third-party may be a non-profit organization.

The method may further comprise receiving a search query from a second sponsor system associated with a second sponsor, searching the information regarding any number of the plurality of upcoming service opportunities based on the search query from the second sponsor system, the search query from the second sponsor system limiting the search to those service opportunities that already have at least one sponsor, providing to the second sponsor system a second third of service opportunities based on the one or more service opportunities that were identified based on the search, receiving, from the sponsor system, a selection of the service opportunity from the list of service opportunities, receiving sponsor conditions that trigger a matching donation based on the selected service opportunity, receiving an indication of the donation of the first sponsor, and providing an indication of the matching donation triggered by the donation of the first sponsor to the second sponsor system.

Generating the query based on at least some of the volunteer information to identify the one or more service opportunities from the service opportunity information may comprise retrieving the at least some of the volunteer information from a stored volunteer record associated with the volunteer and generating the query based on the retrieved the at least some of the volunteer information form the stored volunteer record.

The query may be based on at least some of the volunteer information to identify one or more service opportunities from the service opportunity information includes a limitation for service opportunities with at least one sponsor.

In some embodiments, the method further comprises generating a dashboard and providing the dashboard to an employer that employees a plurality of volunteers, where the dashboard indicates which volunteer of the plurality of volunteers has worked on particular service opportunities. The dashboard may include notifications of upcoming service opportunities that may be available and of interest to all or one of the plurality of volunteers.

The query based on the at least some of the volunteer information to identify the one or more service opportunities from the service opportunity information may include a limitation indicating a specific requirement that may be satisfied by the volunteer associated with the volunteer system.

An example service intelligence system may comprise at least one processor, a network interface to communicate over a network, and memory, the memory including instructions to control the at least one processor to: receive, from a volunteer system remote to the service intelligence system, volunteer information, receive, from a plurality of unrelated service opportunity systems remote to the service intelligence system, service opportunity information regarding a plurality of upcoming service opportunities, the plurality of unrelated service opportunity systems being remote from each other and the volunteer system, generate a query based on at least some of the volunteer information to identify one or more service opportunities from the service opportunity information, search, using the query based on at least some of the volunteer information, to identify the one or more service opportunities from the service opportunity information, provide, to the volunteer system, a first list of service opportunities based on the one or more service opportunities that were identified based on the search, receive, from the volunteer system, a selection of a service opportunity from the list of service opportunities, schedule a volunteer associated with the volunteer system for service associated with the selected service opportunity, notify at least one of the unrelated service opportunity systems associated with the selected service opportunity, receive an indication of completion of the selected service opportunity and an indication of the volunteer's participation in the selected service opportunity, and update a volunteer record associated with the volunteer.

An example method may comprise receiving, from a volunteer system, volunteer information, receiving from a plurality of unrelated service opportunity systems service opportunity information regarding a plurality of upcoming service opportunities, the plurality of unrelated service opportunity systems being remote from each other and the volunteer system, generating a query based on at least some of the volunteer information to identify one or more service opportunities from the service opportunity information, searching, using the query based on at least some of the volunteer information, to identify the one or more service opportunities from the service opportunity information, providing, to the volunteer system, a first list of service opportunities based on the one or more service opportunities that were identified based on the search, receiving, from the volunteer system, a selection of a service opportunity from the list of service opportunities, scheduling a volunteer associated with the volunteer system for service associated with the selected service opportunity, notifying at least one of the unrelated service opportunity systems associated with the selected service opportunity, receiving an indication of completion of the selected service opportunity and an indication of the volunteer's participation in the selected service opportunity, and updating a volunteer record associated with the volunteer.

DETAILED DESCRIPTION

Figure 1:
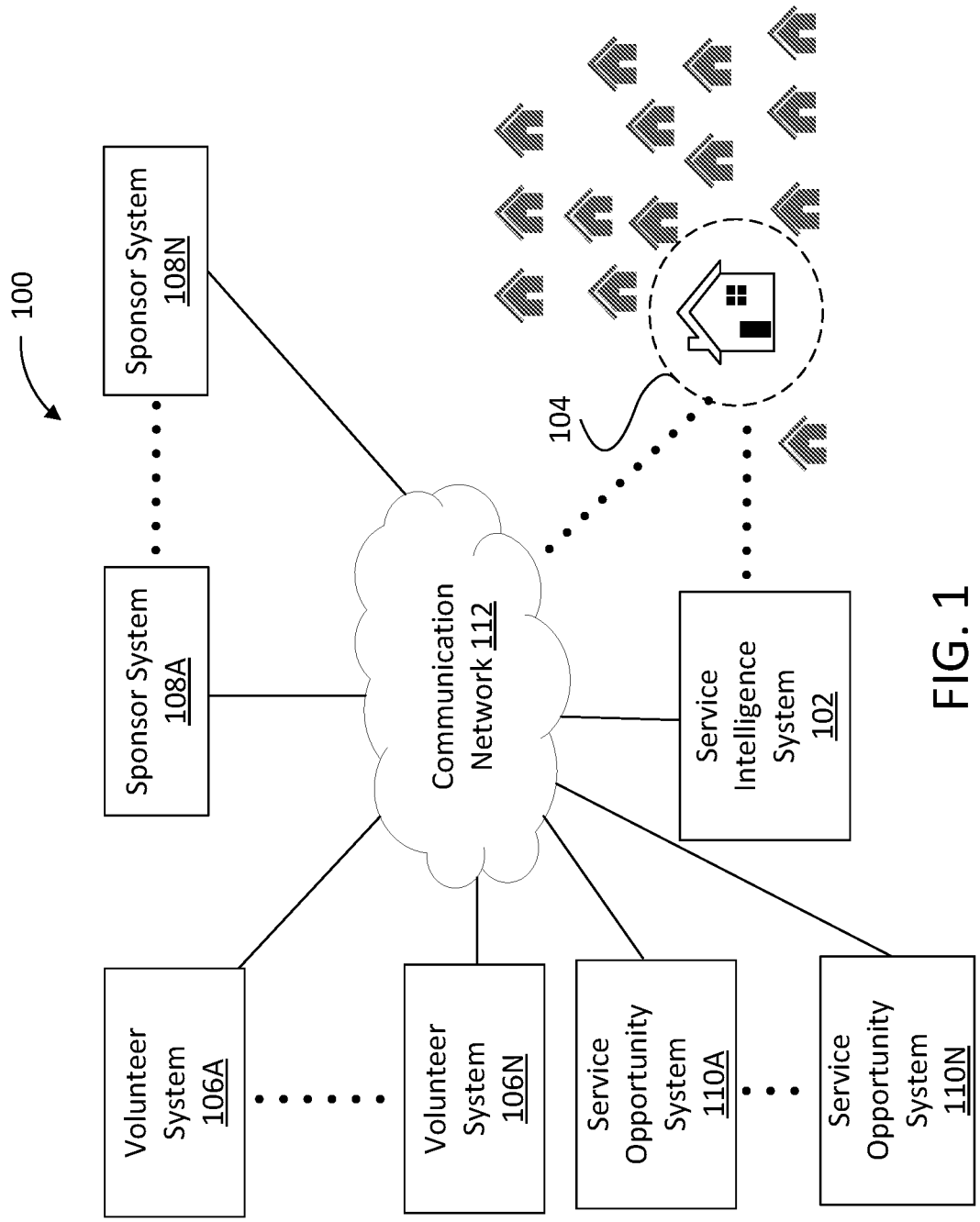
FIG. 1 is an example environment of a service intelligence system for matching and tracking service opportunities with volunteer/volunteer organizations and third-party sponsors to leverage sponsor donations in return for service time in some embodiments.

FIG. 1 is an example environment 100 of a service intelligence system 102 for matching and tracking service opportunities with volunteer/volunteer organizations and third-party sponsors to leverage sponsor donations in return for service time in some embodiments. FIG. 1 includes a service intelligence system 102, a home 104 with service needs, volunteer systems 106A-106N, sponsor systems 108A-108N, service opportunity systems 110A through 110N, and a communication network 112.

In various embodiments, a volunteer system is a system that is associated with a volunteer or volunteer organization that can provide or organize volunteer work. A service opportunity system is a system that is associated with an individual or organization that needs or can connect organizations/people to volunteer work (e.g., build a house, dog walk, take food to the elderly, assist the homeless, assist those with disabilities, apply for SSD benefits, represent individuals in immigration or eviction, and/or the like). A sponsor system is a system that is associated with an organization or individual that would like to donate funds to worthy causes. The sponsor system may also be a system associated with an organization or individual that would like to use donations to increase the amount and quality of service work by connecting donation distribution to work when performed.

The service intelligence system 102 may be a web-based software technology platform for managing commitments across three or more parties. In some embodiments, one party may offer a service opportunity, another party may be a volunteer or volunteer organization, and a third-party may be a sponsor (e.g., an entity that donates goods, financial assets, and/or provide a financial consideration that benefits a charity, person or organization associated with the service opportunity, or a volunteer). The service intelligence system 102 may support multiple unrelated volunteers find unrelated service opportunities. Similarly, the same service intelligence system 102 may support multiple unrelated sponsors to find service opportunities to find unrelated service opportunities and/or volunteers to sponsor.

Volunteerism is the practice of providing time and skills for the benefit of others and causes. In an employment-related context, volunteerism is concerned with the methods and tools employers use to support employees and the community that want to volunteer.

Many organizations (e.g., sponsor systems 108A-108N or volunteer systems 106A-106N) provide time-off for volunteering (e.g., often a paid day or so a year). The company may also mobilize its own resources to allow the entire company to volunteer for a good cause (e.g., a web design business dedicating part of its time to building websites for charities).

A charity may be a non-profit or similar charitable organization, typically with a 501(c)(3) classification under the United States Internal Revenue Code.

The service intelligence system 102 communicates with the communication network 112 to enable different, unrelated volunteers and volunteer organizations to be matched with different service opportunities. The service intelligence system 102 may further enable sponsors to find volunteers and/or service opportunities for funding. Similarly, the service intelligence system 102 may enable sponsors to make donations based on when volunteer work is performed on one or more particular service opportunities and/or the value of that work.

The service intelligence system 102 may enable volunteers or volunteer organizations to register with the service intelligence system. Similarly, the service intelligence system 102 may allow those with needs or organizations that can connect volunteers to register with the system. For example, a service opportunity system 110A may register with the service intelligence system 102 and identify any number of service opportunities that need volunteer work. The service intelligence system 102 may create records for each service opportunity. A service opportunity work record may include a description of the work to be performed, location of the work to be performed, requirements, preferences, hours and dates when the work can be performed, and/or the like. As such, volunteers or volunteer systems may be able search through the service opportunities on the service intelligence system 102 to find service opportunities that are available and accessible. Similarly, the service intelligence system 102 may enable volunteers or volunteer organizations with particular skills to identify service opportunities with special needs or require certain capabilities that the volunteer work that one or more particular volunteer organizations can satisfy.

Even though the volunteers/volunteer systems may be unknown to the service opportunity system or those with service opportunities, the service intelligence system 102 enables these different groups and individuals to find mutually beneficial relationships that benefit those in need. Once a volunteer or volunteer system identifies or selects a service opportunity from the service intelligence system 102, the service intelligence system 102 may enable scheduling and communication between the volunteer/volunteer organization and the service opportunity system/those with needs.

The service intelligence system 102 further allows sponsor system 108A-N to search through volunteers/volunteer systems as well as service opportunities of the needy/service opportunity systems for possible funding opportunities. For example, a sponsor system 108A may search through any number of service opportunities or categories of service opportunities. The sponsor system 108A may condition payment of donation to work being performed on a particular service opportunity or category of service opportunities. In a further example, a sponsor system 108A may find the service opportunity on the service intelligence system 102 that includes cleaning up a local beach on a particular date. The sponsor system 108A may provide a $10,000 donation to a climate improvement group if the cleanup at the local beach happens on or before a particular date. This may encourage volunteers and/or volunteer groups to participate in the local beach cleanup project because their work has additional value. The sponsor system 108A is also encouraged to utilize the service intelligence system 102 to find appropriate service opportunities for donation, encourage additional work, and track success of their philanthropic endeavors.

In another example, a sponsor system 108A may sponsor one or more volunteers. In this example, the sponsor system 108A may search for or otherwise identify one or more volunteers or volunteer organizations. The sponsor system 108A may condition a donation to a third-party (e.g., a charity) or a volunteer organization based on a amount of work performed on any number of service opportunities (e.g., the volunteer or volunteer organization may select the service opportunity based on their overall goals and missions, or, alternately, the sponsor system may identify certain types or categories of service opportunities that when the volunteer or volunteer organization performs works on service opportunities that qualify, the sponsor pays a donation).

It may be appreciated that the service intelligence system 102 may allow any number of unrelated, independent organizations to find appropriate service opportunities for donation and for possible volunteerism. Similarly, the service intelligence system 102 may allow any number of volunteers are volunteer organizations to work with unknown, unrelated sponsors as well as unknown and unrelated service opportunities.

The service intelligence system 102 may track which service opportunities have assigned volunteers as well as which service opportunities have been completed. The service intelligence system 102 may also track past and future volunteer activities of any number of volunteers or volunteer organizations. Similarly, the service intelligence system 102 may track the philanthropic funding, volunteerism, and involvement of any number of sponsor systems (corporations) including total amounts donated over time, sponsorships of donations that are yet unmet, different service opportunities that each sponsor system is related to, tax benefit, and/or the like. In some embodiments the service intelligence system 102 may provide individual dashboard for any number volunteers, service opportunity systems, and sponsors to enable them to track and understand their respective activities.

Although volunteer systems 106A-106N are depicted in FIG. 1, it may be appreciated that there may be any number of volunteer systems. Any of volunteer systems 106A-106N may be run by different entities, organizations, and/or individuals. The volunteer systems may be remote from each other and remote from the service intelligence system 102. For example, volunteer system 106A may be operated by and owned by a volunteer organization such as the Society of St. Vincent DePaul. Volunteer system 106B may be operated by and owned by a different volunteer organization such as the Salvation Army. Volunteer system 106C may be operated by an individual volunteer.

In some embodiments, a volunteer system 106A may be an employee engagement system that provides an ability for an organization's employees to provide services or to donate to charities with a matching benefit from the organization.

Although sponsor systems 108A-108N are depicted in FIG. 1, it may be appreciated that there may be any number of sponsor systems. Any of sponsor systems 108A-108N may be run by different entities, organizations, and/or individuals. The sponsor systems may be remote from each other and remote from the service intelligence system 102.

For example, sponsor system 108A may be operated by and owned by a corporation such as Google. Sponsor system 108B may be operated by and owned by a different corporation such as JPMorgan Chase. Sponsor system 108C may be operated by an individual who wishes to make a contribution or donation.

Although service opportunity systems 110A-110N are depicted in FIG. 1, it may be appreciated that there may be any number of service opportunity systems. Any of service opportunity systems 110A-110N may be run by different entities, organizations, and/or individuals. The service opportunity systems may be remote from each other and remote from the service intelligence system 102. For example, service opportunity system 110A may be operated by and owned by a service organization such as a Church. Service opportunity system 110B may be operated by and owned by a different service organization such as Habitat for Humanity. Service opportunity system 110C may be operated by an individual with needs or is aware of needs that can be satisfied (at least partially) with volunteer service.

The communication network 112 represents one or more computer networks (e.g., LANs, WANs, cellar networks, POTs networks, and/or the like). The communication network 112 may provide communication between any of the volunteer systems 106A-N, the sponsor systems 108A-N, the service opportunity systems 110A-N, service opportunities (e.g., resident at home 104) and the service intelligence system 102. In some implementations, the communication network 112 comprises computer devices, routers, cables, uses, and/or other network topologies. The communication network 112 may be wired and/or wireless. In various embodiments, the communication network 112 may comprise the Internet, one or more networks that may be public, private, IP-based, non-IP based, and so forth.

The home 104 with service needs is an example facility or may represent a person with needs (e.g., home repair). They may be termed as a service opportunity system if they have Internet access. Alternately, their needs may be represented by or through a service opportunity system 110A which may publish the need on the service intelligence system 102. For example, the resident of home 104 may have needs that are published on the service intelligence system 102. Sponsor systems 108A-N may navigate to the service intelligence system 102 to search through service opportunities and find the resident of the home 104, including a description of the resident's needs and choose to sponsor future volunteer work (e.g., provide a donation to a charity or to the resident) if/when the resident's needs are met (even if there are no volunteers yet committed or requesting to work on the resident's particular service need).

Local volunteers may utilize the volunteer system 106A to navigate to the service intelligence system 102 to search through service opportunities and find the resident of the home 104, including a description of the resident's needs, as well as any sponsorships. The volunteers may utilize the service intelligence system 102 to commit to volunteer for the service needs of the resident and the service intelligence system 102 may assist in arranging contacts and scheduling for the volunteers to do the needed work. Once completed, the resident may contact the service intelligence system 102 (e.g., via telephone, email, text, or through the service opportunity system of another) and report completion of the task and/or to request additional work (e.g., create additional service opportunities). The service intelligence system 102 may notify the sponsor system 108A that sponsored the work and/or enable the donation based on the sponsor's previous commitments.

Figure 2:
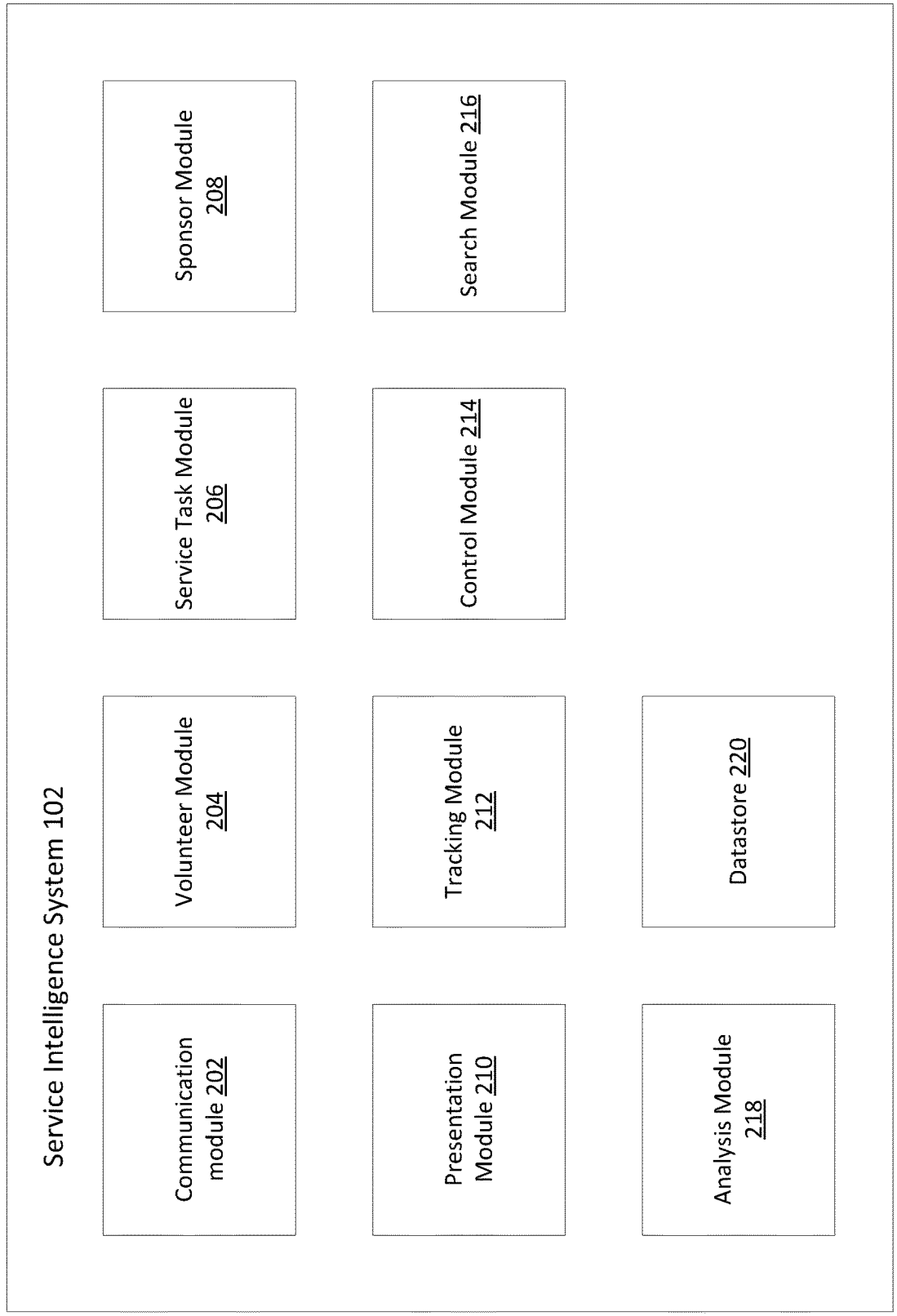
FIG. 2 depicts a block diagram of an example a service intelligence system in some embodiments.

FIG. 2 depicts a block diagram of an example a service intelligence system 102 in some embodiments. The service intelligence system 102 includes a communication module 202, a volunteer module 204, a service task module 206, a sponsor module 208, a presentation module 210, a tracking module 212, a control module 214, a search module 216, an analysis module 218, and a datastore 220.

The volunteer module 204 may allow one or more volunteers or volunteer organizations to find and commit to one or more service opportunities. Further, the volunteer module 204 may enable the one or more volunteers or volunteer organizations to find sponsorship opportunities to fulfill and other volunteers.

In some embodiments, a volunteer or volunteer organization may register with the service intelligence system 102. In the registration, the volunteer may create a volunteer record indicating their name, address, special skills, resources, locations or regions for preferred service, whether sponsored service opportunities are preferred, dates and times of availability, duration of tasks that they are available, and/or the like. A volunteer may also indicate any affiliations with volunteer organizations, service opportunity organizations, sponsors, and/or employers as well as any groups (e.g., clubs or services organizations) or friends (e.g., other volunteers).

The service task module 206 may allow one or more service people, service organizations, or those with needs to publish one or more service opportunities for volunteers and/or find possible sponsors.

In some embodiments, service people, service organizations, or those with needs may register with the service intelligence system 102. In the registration, the service people or service organizations may create a service provider record indicating name, address, and types of service performed and/or types of service opportunities provided.

Further, the service task module 206 may enable creation of service opportunities. In one example, service people or service organizations may create a service opportunity record indicating a location, type of service performed, details of the service to be performed, required special skills, required resources, dates and times of availability, duration of tasks that are available, and/or the like. The service opportunity record may further indicate preferences (e.g., good with the elderly, soft spoken, Spanish speaking) that are not necessarily requirements. In some embodiments, the service task module 206 designates each service opportunity with a unique identifier.

The sponsor module 208 may allow one or more sponsors to sponsor a service opportunity, category of service opportunities, specific volunteers, specific volunteer organizations, and the like. In some embodiments, a sponsor may register with the service intelligence system 102. In the registration, the sponsor may create a sponsor record indicating their name, address, organization relationships (e.g., an employer or corporation), preferred charities, mission statements, and the like.

The sponsor may also create one or more sponsorship opportunities. In one example, a sponsor may create an open sponsorship opportunity or an attached sponsorship opportunity. An open sponsorship opportunity may be open to enable volunteers (workers or organizations) to apply for the sponsorship opportunity for funding or to fund a service opportunity or services organization such as a charity. In this example, an open sponsorship opportunity may include requirements (e.g., type(s) of services that can be performed, duration of performance, special skills required, membership(s), religious affiliation or no religious affiliation, location of services, and/or the like) and preferences (if any).

An attached sponsorship opportunity may be associated (e.g., attached) with a particular service opportunity such that when service is performed for the particular service opportunity and/or the particular service opportunity is performed, then the sponsorship activity (e.g., funding) will occur as defined or described in the attached sponsorship opportunity.

In some embodiments, the sponsor may search a database of service opportunities that meet requirements and/or preferences of the sponsor. The search (described herein) may provide a list of service opportunities that match a query of the sponsor and the sponsor may select one or more service opportunities for further review and to access details. The sponsor may utilize the sponsor module 208 to attach a sponsorship opportunity with one or more service opportunities. Once all or part of the service opportunity is completed and confirmation is received, the sponsor may provide funding to the volunteer, volunteer organization, needy person associated with the service opportunity, and/or one or more charities as per the description or details of the sponsor record.

A presentation module 210 may be configured to generate and/or provide one or more graphical user interfaces to volunteers, sponsors, and/or service opportunity providers (e.g., people or devices associated with service opportunities). The presentation module 210 may provide graphical user interfaces to enable volunteers, sponsors, and/or service opportunity providers to search for available service opportunities, other volunteers, or sponsorship opportunities, for example. The presentation module 210 may also present one or more dashboards discussed herein.

A tracking module 212 may receive service information from an entity or person associated with a service opportunity regarding performance of tasks or service associated with the service opportunity. For example, once a task is completed, the person for whom the task was completed may provide a notification (e.g., by email, text, phone call, interview, questionnaire, or the like) that the task was completed. The service information may optionally include the name(s) of the volunteers or volunteer organization involved, dates and/or times of completion, level of satisfaction of completion, recommendations, and/or the like.

In some embodiments, the tracking module 212 may receive a ranking of the quality of service provided by a volunteer or volunteer group, a ranking of quality in working with one or more people associated with a particular service opportunity, and/or a sponsorship ranking of quality indicating how the donation process proceeded. A volunteer may rank a sponsor or one or more people associated with a particular service opportunity based on their past experience. Similarly, one or more people associated with a particular service opportunity may rank volunteers or sponsors based on their past experience. The rankings may appear within the graphical user interface of the service intelligence system 102 that depicts information for different volunteers, service opportunities, and/or sponsors.

The tracking module 212 may update the service opportunity record, the volunteer record, and/or the like to indicate performance of the task or service opportunity. The tracking module 212 may also recategorize the service opportunity as a completed service opportunity based on the service information. In some embodiments, the tracking module 210 may track the completion or percentage of completion of a task or service opportunity.

A service opportunity is any service project including a task or combination of tasks. The service opportunity may include an indication of the requirements of the service, dates of service, type of service, and location of the service. A service opportunity may include an indication of requirements (e.g., Spanish speaking, legal skills, electrical skills, or the like). A service opportunity may be "open," "committed," or "closed." An open service opportunity is an upcoming service opportunity that does not have a volunteer or volunteer organization assigned. A volunteer or volunteer organization may search through various open service opportunities to make selections for a project or service opportunity.

A committed service opportunity is an existing service opportunity whereby any number of volunteers and/or volunteer organizations are assigned. The service opportunity may be currently in progress. For example, if the service opportunity is building a house, the house construction may be underway. In some embodiments, volunteers or volunteer organizations may still join a committed service opportunity. In the example where the service opportunity is building a house, there may still be a need for more volunteers or volunteers with special skills (e.g., carpentry, electrical, or the like). A volunteer or volunteer organization may search through service opportunities and commit to an open service opportunity or a committed service opportunity.

A closed service opportunity is a service opportunity that has been completed.

A control module 214 may control funding of one or more service opportunities. In some embodiments, once a sponsor chooses to sponsor a particular service opportunity, the sponsor may create a sponsorship record indicating the particular service opportunity (e.g., with a unique number), the amount of funding, requirements that must be met to trigger funding, and which entities are to be funded. The sponsor may also, in some embodiments, provide funds to the control module 214 which may hold those funds. In one example, the control module 214 may hold the funds in trust.

Once the tracking module 212 indicates that all or part of the particular service opportunity is performed, the tracking module 212 may provide confirmation and/or any details required to the control module 214. The control module 214 may then, utilizing the sponsorship record, confirm that each requirement has been met based on the information from the tracking module (e.g., the particular service opportunity has been performed, name of volunteer(s), time frame when completed) and then provide the funds from trust to the designated destination(s) (e.g., designated charities, entities, people, and/or the like).

In another example where funds have not been previously transferred to the service intelligence system 102, the control module 214 may, utilizing the sponsorship record, confirm that each requirement has been met based on the information from the tracking module (e.g., the particular service opportunity has been performed, name of volunteer(s), time frame when completed) and then provide a notice to the sponsor to transfer or provide funds to the designated destination(s) (e.g., designated charities, entities, people, and/or the like).

In some embodiments, the search module 216 may match volunteers with service opportunities. For example, the search module 216 may utilize all or some of the volunteer record (e.g., special skills, resources, locations or regions for preferred service, whether sponsored service opportunities are preferred, dates and times of availability, duration of tasks that they are available, and/or the like) and match them with requirements of one or more service opportunities based on service opportunity records. In some embodiments, the search module 216 may sort found (e.g., qualifying) service opportunities based on preferences of the search opportunity and/or preferences identified in the volunteer record.

The search module 216 may enable volunteers, sponsors, and/or those with service opportunities to search and match needs, capabilities, and resources. For example, the datastore 220 may include a database of volunteer organizations, volunteer workers, sponsors, service opportunities, those with service opportunities, and organizations with service opportunities. The search module 216 may enable users to query the database to locate desired information.

In one example, a volunteer worker may wish to search for a suitable service opportunity. The volunteer worker may generate a query including region for suitable service opportunities, categories of service opportunities (e.g., pet care, legal support, food delivery), time requirements (e.g., recurring needs, 1 hour time commitment, 2 hour time commitment, time commitment expected to last over days or weeks, or the like), special skills required (e.g., legal skill), capabilities (e.g., data entry), resources (e.g., a car or food), value of service opportunity, committed funds from a sponsor (if any), and/or the like.

In response to the query, the search module 216 may search the database for matching service opportunities and the presentation module may provide them to the volunteer worker in a list. The list may be sorted or further filtered to assist with the volunteer worker in selecting one or more service opportunities for more details (e.g., specific location, people or organizations involved with the service opportunity, sponsor providing funds associated with the service opportunity, details regarding time commitment, non-required but desired preferences associated with the service opportunity, and the like). The volunteer worker may commit to the service opportunity upon which the service opportunity may be recategorized as a "committed service opportunity" from an "open service opportunity" (once the task or service opportunity is satisfied through the work of the volunteer, the service opportunity may be recategorized as a "closed service opportunity" if there is no more that needs to be done associated with that particular service opportunity).

In another example, a sponsor (e.g., a sponsor organization) may wish to search for a suitable service opportunity. The sponsor may generate a query including region for suitable service opportunities, categories of service opportunities (e.g., pet care, legal support, food delivery), time requirements (e.g., recurring needs, 1 hour time commitment, 2 hour time commitment, time commitment expected to last over days or weeks, or the like), special skills required (e.g., legal skill), capabilities (e.g., data entry), resources (e.g., a car or food), value of service opportunity, committed funds from a sponsor (if any), and/or the like.

In response to the query, the search module 216 may search the database for matching service opportunities and the presentation module may provide them to the sponsor in a list. The list may be sorted or further filtered to assist with the sponsor in selecting one or more service opportunities for more details (e.g., specific location, people or organizations involved with the service opportunity, sponsor providing funds associated with the service opportunity, details regarding time commitment, non-required but desired preferences associated with the service opportunity, and the like).

The sponsor may utilize the analysis module 218 (discussed herein) to valuate the service opportunity(ies). In one example, the sponsor may select an option to valuate one or more service opportunities in the list. The presentation module 210 may display a valuation associated with one or more service opportunities in the list.

The sponsor may commit to financing the service opportunity upon which the service opportunity may be recategorized as a "financed service opportunity" from an "unfinanced service opportunity" (once the task or service opportunity is satisfied through the work of the volunteer, the service opportunity may be recategorized as a "closed service opportunity" if there is no more that needs to be done associated with that particular service opportunity).

In another example, a service opportunity organization may wish to search for a similar service opportunity and/or sponsorship opportunities. A service opportunity organization may generate a query including region for related service opportunities, categories of service opportunities (e.g., pet care, legal support, food delivery), time requirements (e.g., recurring needs, 1 hour time commitment, 2 hour time commitment, time commitment expected to last over days or weeks, or the like), special skills required (e.g., legal skill), capabilities (e.g., data entry), resources (e.g., a car or food), value of service opportunity, committed funds from a sponsor (if any), and/or the like.

In response to the query, the search module 216 may search the database for matching service opportunities and the presentation module may provide them to the service opportunity organization in a list. The list may be sorted or further filtered to assist with the volunteer worker in selecting one or more service opportunities for more details (e.g., specific location, people or organizations involved with the service opportunity, sponsor providing funds associated with the service opportunity, details regarding time commitment, non-required but desired preferences associated with the service opportunity, and the like).

The service opportunity organization may utilize all or some of the listing(s) to create a new service opportunity, including language and description to encourage engagement.

In some embodiments, the service opportunity organization may wish to search for sponsorship opportunities. The service opportunity organization may create a query including amount of sponsor contribution, categories that are supported by different sponsors, recurring contributions from sponsors, sponsor requirements (e.g., type of service to be performed, duration of performance, mission of sponsor organization, religious affiliation (if any), and the like). In some embodiments, the service opportunity organization may generate a query for overlapping sponsorship offerings, for example categories and locations that two or more sponsors may offer contribution.

In response to the query, the search module 216 may search the database (e.g., within the datastore 220) for matching sponsorship opportunities and the presentation module may provide them to the service opportunity organization in a list. The list may be sorted or further filtered to assist with the service opportunity organization in selecting one or more sponsorship opportunities for more details (e.g., specific location, people or organizations involved with the sponsorship opportunity, sponsor providing funds, details regarding time commitment, non-required but desired preferences associated with the service opportunity, and the like).

In some embodiments, one sponsor may utilize the search module 216 to search for similar sponsorship opportunities in order to create a new sponsorship opportunity. A sponsorship opportunity may be open or attached. An open sponsorship opportunity may be open to enable volunteers (workers or organizations) to apply for the sponsorship opportunity for funding or to fund a services organization such as a charity. In this example, an open sponsorship opportunity may include requirements (e.g., type(s) of services that can be performed, duration of performance, special skills required, membership(s), religious affiliation or no religious affiliation, location of services, and/or the like) and preferences (if any). An attached sponsorship opportunity may be associated with a particular service opportunity such that when service is performed for the particular service opportunity and/or the particular service opportunity is performed, then the sponsorship activity (e.g., funding) will occur as defined or described in the attached sponsorship opportunity.

The analysis module 218 may assess a value associated with a contribution or service. It may be appreciated that the analysis module 218 may assess a value associated with a contribution or service in any number of ways.

In one example, the analysis module 218 may categorize services and have a value or a range of values associated with that service. For example, a need for dog walking may be categorized as "dog walking" or "pet care" and there may be a value associated with that category (or combination of categories) for one pet per one unit of time (e.g., an hour).

In some embodiments, the analysis module 218 may include parameters associated with the category that may influence value estimation. For example, the analysis module 218 may determine a location of the service to be performed and the determine a region or locality. Based on that region or locality, the analysis module 218 may determine or select a value or range of values for that particular category of service. For example, New York city may have a higher value associated with the category of pet care per hour than Rochester.

Valuation of a service may be based on any number of parameters, including but not limited to duration of each period of time it takes to complete a task or portion of a task, location of the task, number of days or hours it takes to complete or meet a task's requirements, special skills (e.g., representing an individual in SSD hearings), and the like. The analysis module 218 may categorize different services and then adjust or determine valuation associated with the work to perform all or part of that task.

The datastore 220 may store information such as volunteer records, service opportunity records, sponsor records, and the like. The search module 216 may search all or part of the datastore 220 for service opportunities based on the service opportunity records based on filtered rules (e.g., location and upcoming service opportunities), based on preferences of the volunteers, service opportunity personnel, and/or sponsors, queries provided by the presentation module 210, and/or the like. The datastore 220 may include any number of data structures (e.g., tables or databases) to store all or some of the information.

The service intelligence system 102 may include an agreement module (not depicted in FIG. 2). The agreement module may facilitate creation of an agreement between two or more parties. In various embodiments, the agreement module may be able to identify and search agreement templates and populate the agreement templates based on records and information from the parties. In some embodiments, the agreement module may facilitate an agreement between a volunteer, entity associated with a service opportunity, and a sponsor. The agreement module is further discussed herein.

Figure 3:
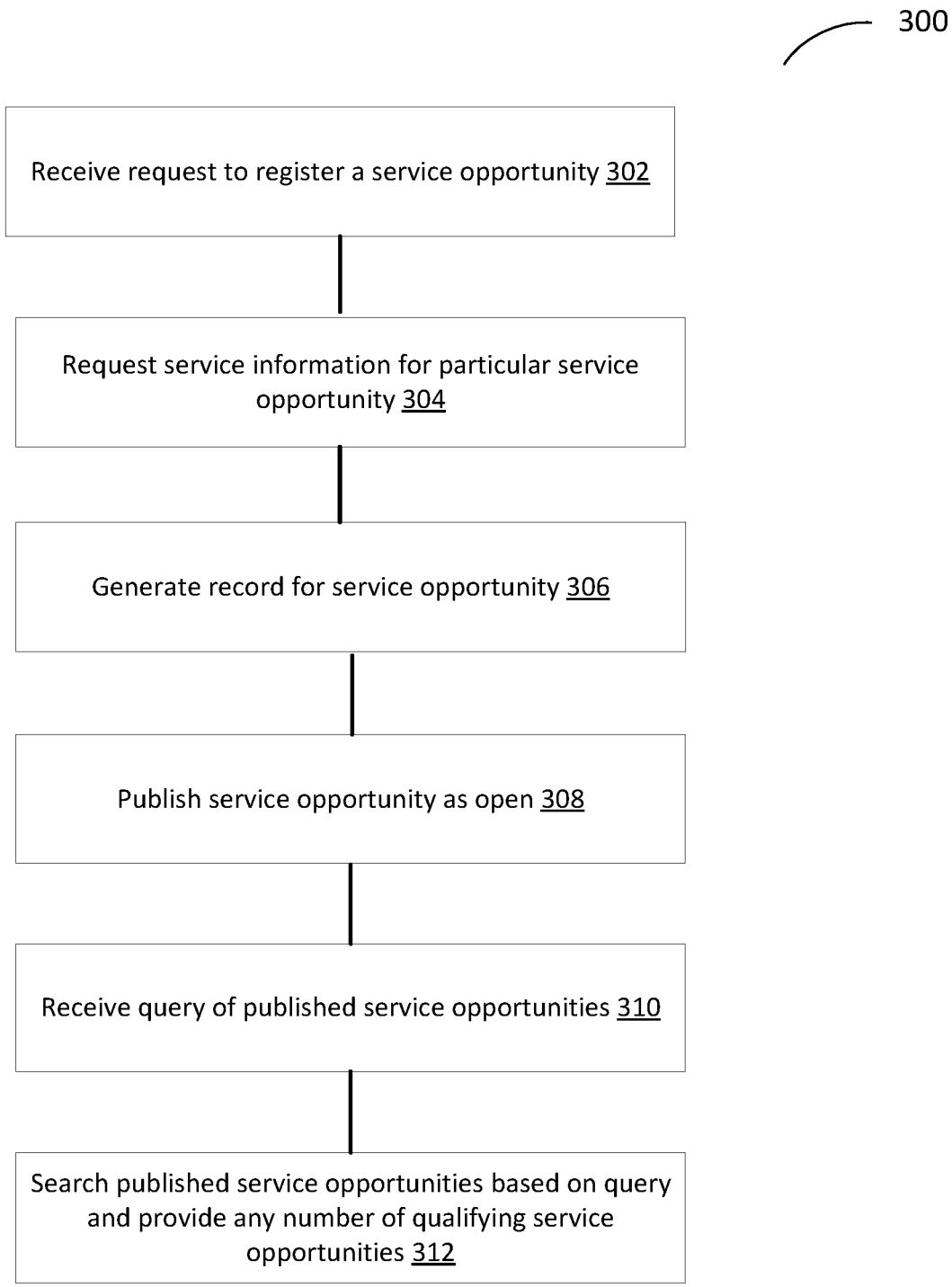
FIG. 3 is an example method for a person with needs or an organization representing a person with needs may utilize the service intelligence system to publish the service opportunity for matching with volunteers, volunteer organizations, and/or sponsors in some embodiments.

FIG. 3 is an example method for a person with needs or an organization representing a person with needs may utilize the service intelligence system 102 to publish the service opportunity for matching with volunteers, volunteer organizations, and/or sponsors in some embodiments. In step 302, the service intelligence system 102 registers a service opportunity. In one example, the service intelligence system 102 receives a request to register a service opportunity from a service opportunity system 110A (e.g., an individual or organization associated with one or more service opportunities). The service opportunity may be any future opportunity for volunteer work.

The service intelligence system 102 may receive requests for service opportunities from different, unrelated people or systems. As such the service intelligence system 102 may be a clearinghouse on a network to enable unrelated people or systems to post and publish service opportunities. Similarly, the service intelligence system 102 may be a clearinghouse on the network to enable unrelated, independent volunteers in different locations with different skills to find geographically available service opportunities with the right requirements to enable them to successfully complete tasks. Furthermore, the service intelligence system 102 may be a clearinghouse of the network to enable unrelated, independent sponsors (e.g., unrelated, independent corporations or other organizations) to find and sponsor volunteers, volunteer organizations, service opportunities, and service opportunities in different locations, at different times, and track performance as well as their amounts of donations.

In response to the request in step 304, the communication module 202 requests information from the entity that provided the request to register the service opportunity for the particular service opportunity. Service information may include, for example, location where services to be performed, dates when service is to be performed, time and services to be performed, contacts for service, categories or types of service that is to be performed, organization affiliations (if any), requirements to fulfill the service opportunity, preferences for the service opportunity, or the like.

In step 306, the service task module 206 may generate a record for the particular service opportunity including all or some of the service information. The service task module 206 may store the particular service opportunity record in the datastore 220.

In step 308, the presentation module 210 may publish the particular service opportunity among other service opportunities. In one example, the presentation module 210 may provide an interface listing different service opportunities. A volunteer, sponsor, or other individual may search through the listings. In some embodiments, the search module 216 provides a search function that enables the volunteer, sponsor, or other individual to input a query or filter the listings of different service opportunities. Filters may include, for example, categories of service opportunities, requirements for service opportunities, sponsored/unsponsored service opportunities, location of service opportunities, dates/times of service opportunities, preferences service opportunities and/or the like. Queries may similarly include for example categories of service opportunities, requirements for service opportunities, location of service opportunities, dates/times of service opportunities, preferences service opportunities and/or the like. Queries may also include identities of particular volunteers to determine which upcoming service opportunities that other particular volunteers will be present for, or service opportunities associated with past service opportunities that particular volunteers worked with in the past. Queries may include individuals associated with the service opportunity (e.g., a particular person who needs to have their dog walked), organizations associated with service opportunities, people involved in particular service opportunities, or the like.

In step 310, the communication module 202 may receive a query for published service opportunities. The query may be generated by volunteer system 106A, sponsor system 108A, or other organization or individual. The query may be utilized to search through available service opportunities (e.g., open and/or committed service opportunities). In various embodiments, the presentation module 210 may provide a graphical user interface with a query field to enable the user that navigates to the GUI over the network to search for volunteers, volunteer organizations, service opportunities, service opportunity organizations, sponsors, and/or sponsor organizations.

In step 312, the control module 214 searches published service opportunities from a database of published service opportunities based on the query received in step 310. The control module 214 may provide any number of qualified service opportunities back to the requester (e.g., back to the volunteer system 106A, sponsor system 108A, or other organization or individual who sent the request). In various embodiments, the presentation module 210 may provide a graphical user interface or display information within the graphical user interface to provide query results to the requesting entity.

In some examples, requesting entity may request service opportunities that are available in the near future, within a certain geographical region, and is already sponsored. The control module 214 may search a database of published service opportunities that fit this criteria and provide a list of those qualifying service opportunities back to the requesting entity.

Figure 4:
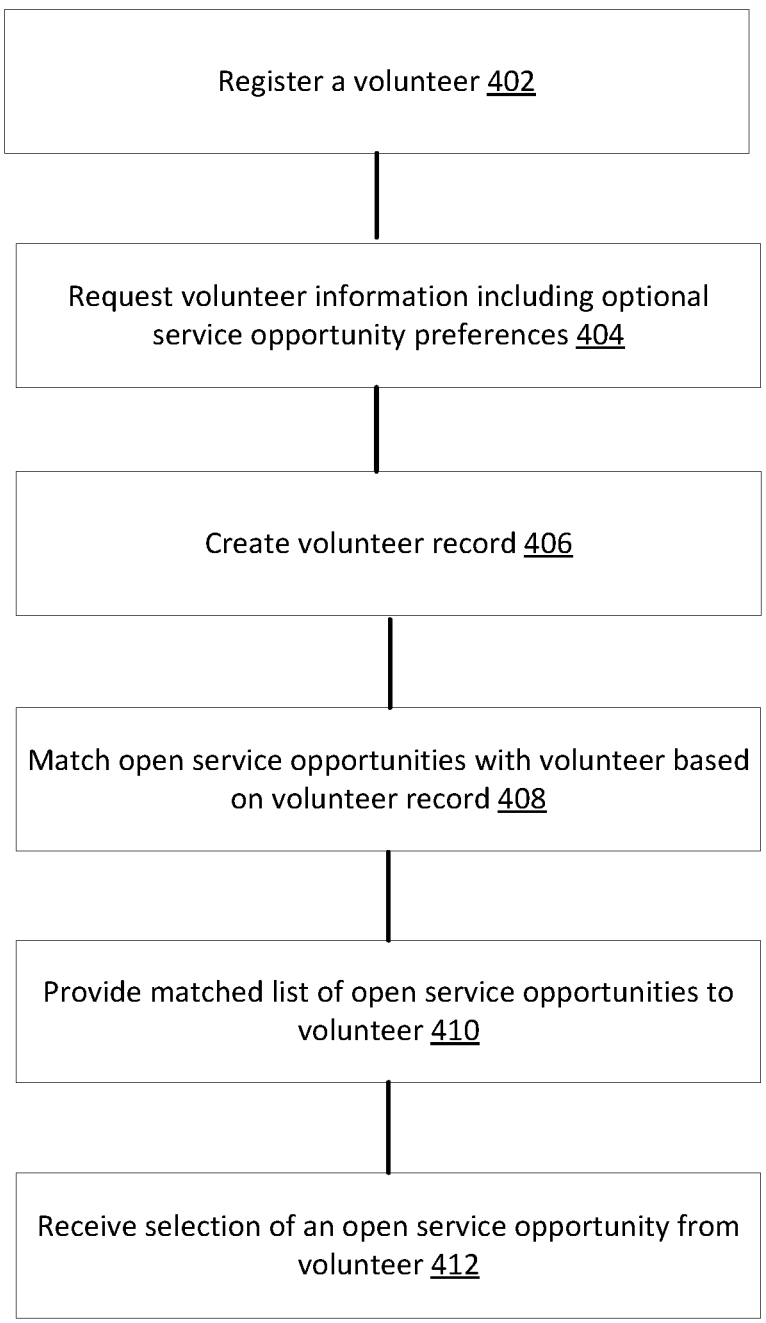
FIG. 4 is an example method for a volunteer registering and finding a service opportunity in some embodiments.

FIG. 4 is an example method for a volunteer registering and finding a service opportunity in some embodiments. In step 402, a volunteer or volunteer system 106A registers with the service intelligence system 102. In one example, a volunteer looking for a service opportunity may utilize their volunteer system 106A to navigate the communication network to reach the service intelligence system 102. The service intelligence system 102 may utilize the presentation module 210 to generate a graphical user interface in a webpage to enable the volunteer to register with the service intelligence system 102. During registration, the volunteer module 204 may receive information from the volunteer and create a volunteer record. The volunteer record may include information regarding volunteer including, for example, location volunteer, name, contact information, and the like. The volunteer record may be stored within data store 220. In some embodiments, other volunteers or service opportunity systems may seek or search for available volunteers using the service intelligence system 102. In this case, all or some of the information from the volunteer record may be published and/or provided to the requester.

In step 404, volunteer module 204 request volunteer information including optional service opportunity preferences. As discussed herein, the volunteer module 204 and/or the presentation module 210 may include request for information within a graphical user interface generated response to the request to register volunteer. Volunteer information can include, but is not limited to, name of the volunteer or volunteer organization, address, and contact information (e.g., phone, cell phone number, email, text message number, or the like).

In some embodiments, the volunteer module 204 may request service opportunity preferences from the volunteer. A service opportunity preference includes a type of service opportunity that the volunteer may be interested in. For example, a service opportunity preference may include geographical region, type of service work (or category of service work), service work requiring or preferring certain capabilities (e.g., Spanish speaking), whether they prefer to work unsponsored service projects, whether there is other volunteers they prefer to work with, and the like.

In step 406, the volunteer module 204 receives the volunteer information and creates or adds information to a volunteer record. The volunteer module 204 may store the volunteer record in the data store 220.

In some embodiments, the service intelligence system 102 may automatically match volunteers with one or more service opportunities. It may be appreciated that one or more volunteer records may include volunteer preferences which may help the service intelligence system 102 identify available service opportunities that may be of interest to volunteer. In some embodiments the service intelligence system 102 may collect service opportunity information about one or more service opportunities. The service opportunity information may include preferences, capabilities, or requirements needed for the service opportunity. The service intelligence system 102 may match volunteer preferences with information associated with the service opportunity (e.g., location, availability and the like), and/or service opportunity information.

In step 408, the control module 214 may match one or more volunteers with service opportunities based on one or more volunteer records. In one example, a volunteer may navigate to the service intelligence system 102 and receive a webpage from the service intelligence system 102. The webpage may include an interactive object, to allow the service intelligence system 102 to find and list one or more service opportunities that may be of interest to the volunteer.

In one example, the control module 214 retrieves a volunteer record of the volunteer requesting automated message to find a service opportunity. The control module 214 may search available service opportunities by generating a query based on all or some of the information in the volunteer record including, for example, preferred region of the volunteer, preferred type of service, past volunteer service, and the like. In one example, the query may request service opportunities to be performed within one month of the request and be within 5 miles of the volunteer's address.

In a further example, the control module 214 may utilize a predetermined distance (e.g., within 20 miles, within 10 miles, within 5 miles, or the like) from an address of the volunteer based on that volunteer's volunteer record. In some embodiments, the volunteer may identify ranges from their address for volunteer work. The range may be located in the volunteer record or by the volunteer adding that information manually into a graphical user interface.

Similarly, the control module 214 may utilize a predetermined length of time (e.g., within the next 5 days, 7 days, 2 weeks, 1 month, or the like) from the time of the automated search to identify an upcoming service opportunity. The volunteer may identify predetermined lengths of time within their record or may input a preferred length of time manually into the graphical user interface when requesting an automated match.

The control module 214 may retrieve volunteer preferences from the volunteer records and volunteer capabilities. Volunteer preferences may include preferences for a certain type of service opportunity work (e.g., dog walking, service to the elderly, service to the blind, cooking, delivering food, or the like) as well as certain capabilities of the volunteer (e.g., Spanish speaking, legal skills, and the like).

The volunteer record may also include a list of past service opportunities in which the volunteer provides services. The control module 214 may identify or retrieve a service opportunity type that fit the past service volunteer activities (e.g., dog walking, service to shut-ins, gardening, electrical work, cooking, and/or the like). The service opportunity type may be used to assist in cataloguing possible service opportunities for matching with volunteer's query.

In some embodiments, the volunteer record may also include preferred service opportunity types. A volunteer may input the preferred service opportunity types into the graphical user interface.

The volunteer record may also include charity or group affiliations. For example, a volunteer may indicate an affiliation with UNICEF, the Salvation Army, or the like. The charity or group affiliations may be associated with certain types of or categories of service work which may be used as a service work preference and matching future service work for the volunteer.

The control module 214 may create a query using all or some of the volunteer preferences, capabilities of the volunteer, length of time to upcoming service opportunities, location of the service opportunities, similarity to past volunteer work, or the like. The control module 214 may apply the query to retrieve a list of open service opportunities that fit the query.

In step 410, the control module 214 and/or the presentation module 210 may provide a list of open service opportunities to the volunteer based on the query generated by the control module 214. The list of open service opportunities may be ordered based on date of service, location service, volunteer preference, and/or the like.

In step 412, the service intelligence system 102 (e.g., via the search module 216, presentation module 210, or control module 214) may receive a selection from the volunteer of one or more of the open service opportunities from the list of open service opportunities. Once one or more service opportunities are selected, the service intelligence system 102 may provide additional information regarding the selected service opportunities and/or allow the volunteer to commit to volunteer work associated with the service opportunities. Further, the service intelligence system 102 may assist in scheduling and/or contacting the volunteer with contacts or a person with needs associated with the service opportunities.

In some embodiments, the service intelligence system 102 may generate an agreement using agreement templates to create a contract between the volunteer and the person with needs. The agreement may optionally include an entity that operates or controls the service intelligence system 102 (e.g., to include a fee for services of scheduling or arranging the service). The agreement may also optionally include one or more sponsors that may commit to providing funds, services, goods, supplies, and/or the like in conjunction with the service opportunities.

In some embodiments, the service intelligence system 102 may include or connects to a social network system that enables volunteers to volunteer for various service opportunities as a group. In one example, volunteers may be able to identify other volunteers or volunteer groups in the query in the service intelligence system 102 and the service intelligence system 102 may provide a list of those volunteers or volunteer groups as well as past present and future service opportunities in which the volunteers or volunteer group are involved.

As follows, in some examples, the volunteer module 204 may enable the formation of volunteer groups. A volunteer may, at the time of registration or after registration, identify with one or more volunteer groups. The volunteer group identification information may be stored within the volunteer record. Each volunteer group may include any number of volunteers. A volunteer leader or group of leaders may be designated by volunteer group. A volunteer leader may be enabled by the service intelligence system 102 to commit volunteer group to one or more service projects. A volunteer group is committed to the service project, the service intelligence system 102 may update each volunteer record of each member of the group to indicate the commitment to the service opportunity and may send out a notification (e.g., via, email, phone, or communication based on how the volunteer prefers to be contacted) indicating the service opportunity. In some embodiments, the notification may include a request (e.g., an interactive button) for the volunteer to confirm their commitment before the service intelligence system 102 commits that particular volunteer to the service opportunity.

In some embodiments, the service intelligence system 102 may include a particular volunteer webpage for each volunteer and/or volunteer group. In particular volunteer webpage may include past, present, and/or future service opportunities in which that particular volunteer or volunteer group has been involved. The particular volunteer webpage may further include comments regarding those service opportunities, sharing about their experiences, information regarding experiences with a person of need associated with the service opportunity sponsors, and/or the like.

Figure 5:
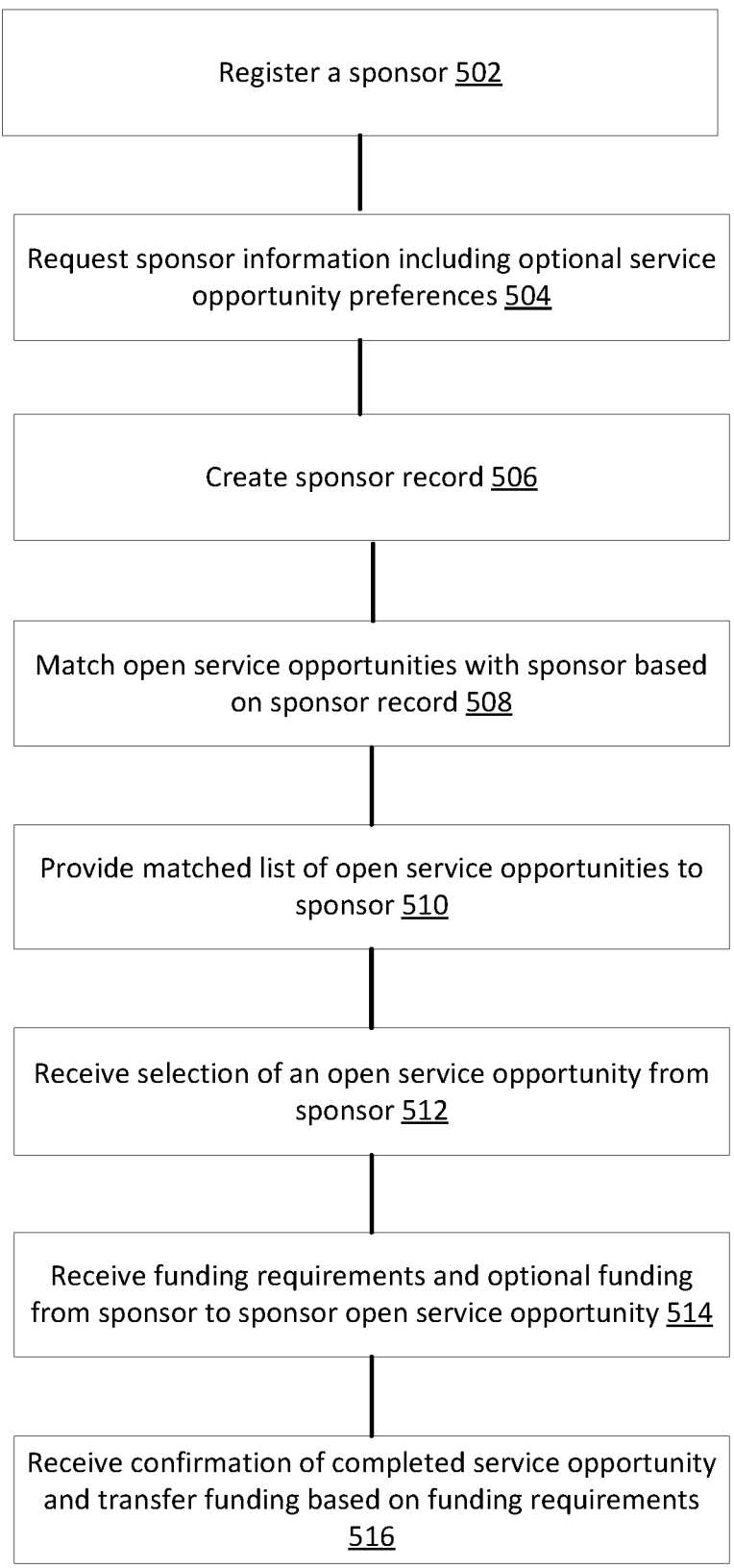
FIG. 5 depicts an example method for a sponsor to find and fund a service opportunity in some embodiments.

FIG. 5 depicts an example method for a sponsor to find and fund a service opportunity in some embodiments. In this method, a sponsor may wish to find one or more service opportunities that fit their need and/or requirements in order to provide volunteer help and or sponsorship. When a service opportunity is sponsored, a sponsor may provide funds (e.g., a donation) when work is performed and/or the service opportunity is completed. In some embodiments a sponsor may provide funds in exchange for a quality of work being performed (e.g., a higher quality of work associated with the service opportunity may lead to a higher donation). The donation may be made to volunteer organization, charity, a nonprofit organization, a person of need associated with the service opportunity, and/or the like.

In step 502, a sponsor may optionally register with the service intelligence system 102. The sponsor may use a sponsor system 108A may navigate to the service intelligence system 102 over a communication network 112 using, for example, a browser. The sponsor module 208 may receive the registration request from the sponsor. In step 504, the sponsor module 208 and/or the presentation module 210 may provide a graphical user interface back to the requesting sponsor. Graphical user interface may request additional information regarding the sponsor to enable the creation of a sponsor record. The sponsor may provide sponsor information in response to the request for additional information.

The sponsor information may include, for example, the name of the sponsor, contact information for the sponsor, in address for the sponsor, preferred charities, preferred nonprofits, associations, and/or sponsor preferences. Sponsor preferences may include categories or types of service opportunities that the sponsor wishes to sponsor. Sponsor preferences may also include preferred volunteers or volunteer organizations. In some embodiments, sponsor preferences may include geographical regions where the sponsor may prefer to sponsor as well as specific dates for preferred sponsorships. Sponsor preferences may also include preferred charities, nonprofits, and/or other organizations that may receive donations from the sponsor.

In step 506, the sponsor module 208 may create a sponsor record. The sponsor module 208 may store the sponsor record in the data store 220. It will be appreciated that steps 502-2506 may be optional.

In step 508, the control module 214 may match open service opportunities with sponsors based on their sponsor record. As discussed regarding volunteer matching, the control module 214 may utilize all or some of the information from the sponsor record and or information manually input by the sponsor to retrieve one or more qualifying open service opportunities from a database of open service opportunities. In one example the control module 214 may generate a query including preferred geographical regions, preferred dates, preferred categories or types of sponsorship opportunities, and/or the like.

In step 510, the control module 214, presentation module 210, or search module 216 may provide a list of open service opportunities based on a query back to the requesting sponsor.

In step 512, the control module 214, presentation module 210, or search module 216 may receive a selection of one or more open service opportunities of the list from the sponsor. For example, the sponsor may select one or more of the open service opportunities from the provided list. In response the selection, the control module 214 or the presentation module 210 may provide additional information regarding the selected one or more open service opportunities. The additional information may include scheduling information, contact information for people associated with the service opportunity or volunteers or other information. In some embodiments the sponsor may select one or more service opportunities to commit for sponsorship.

In some embodiments, an individual or potential sponsor may identify an already sponsored opportunity to increase the donation value of the volunteer work such that the volunteers are encouraged to trigger a greater benefit. In various embodiments, an individual or potential sponsor may choose to sponsor a particular service opportunity, type of service opportunity, or volunteers and trigger a donation when another sponsor or other individual also donates (e.g., by matching the donation).

If the sponsor selects one or more service opportunities to commit for sponsorship, the sponsor module 208 may provide an interface or update an interface to request funding requirements and/or funding to sponsor an open service opportunity in step 514.

In some embodiments, a sponsor may identify funding requirements which must be met before the sponsor donates an amount of money or goods. In one example, funding requirements may include an amount of donation, an entity that will receive the donation, and conditions when the donation will be triggered. Conditions may include, for example, when the service opportunity is completed, when the service opportunity is partially completed, when a predetermined number of volunteer hours have been completed towards the service opportunity, and/or when a quality of volunteer work is above a particular threshold.

In one example, conditions include a $10,000 donation to go to St. Jude's Hospital when a particular house for Habitat for Humanity has been completed. In another example, conditions may include a $15,000 donation to go to a particular charity when 20 hours of food delivery to an area undergoing a state of emergency has been completed.

In a further example, conditions may include different amounts of a donation to a particular charity when a particular level of skilled labor has been completed in a service opportunity. In some embodiments, a skilled craftsman may grade or otherwise determined a quality of work performed by a volunteer. If the skilled craftsman identifies the work as being at or above a particular threshold, the conditions may indicate that a particular amount of donation is to be provided to the particular charity. If the skilled craftsman identifies the work as being at or above one threshold but below another threshold, then the conditions may indicate that a lesser amount of donation is to be provided to the particular church. It will be appreciated that there may be any number of ways to determine the quality of work and based donations on the quality. In some embodiments, the conditions may include a list of different tasks to be performed by the service opportunity with different donations associated with different tasks. As the different tasks are completed then different donations may be triggered (e.g., carpentry in building a house for the homeless, gardening, electrical work, roof work, and the like).

The analysis module 218 may include a range of values for a variety of different tasks. The analysis module 218 may provide different values for different tasks to the sponsor to enable the sponsor to identify reasonable donations based on the difficulty in quality of work associate with the different tasks.

In some embodiments, the analysis module 218 may analyze the quality of work and provide a score for that quality of work to enable a determination of an amount of donation to be funded based on that quality of work. In one example, the analysis module 218 may utilize information from skilled professionals that grade the quality of the work, standards organizations that ensure the quality of work is above a particular level (e.g., to be certified by a particular city), or the like to assist in generating a score or indicating that particular level work has been performed. A sponsor may choose different levels of donations to be donated based on the different levels of work. In another example, the analysis module 218 may information from a person receives the benefit of the service opportunity that indicates their satisfaction with the work and/or any other indications of the quality of the work. The analysis module 218 may use some or all the information from the person who receives the benefit of the service opportunity to assess the quality of the work.

In some embodiments, the service intelligence system 102 may receive funding from a particular sponsor in advance of or during the service opportunity. The service intelligence system 102 may store that money in trust and trigger donations from that money in trust based on the identified conditions.

In step 516, the tracking module 212 may receive a confirmation of a completed service opportunity. The confirmation may be sent from a person associated with the service opportunity (e.g., a person of need associate with the service opportunity to sense confirmation by telephone, email, web indication, report or the like to the service intelligence system 102). In some embodiments, a confirmation may be provided by one or more volunteers and/or one or more sponsors. In some embodiments, the tracking module 212 may receive a confirmation of any number of tasks associate with the service opportunity and/or completion of any portion of the service opportunity. The tracking module 212 may also confirm against sponsor conditions to determine when funding has been triggered. If funding has been triggered, then the presentation module 210 and/or the tracking module 212 may provide a notification to one or more sponsors that have sponsored the service opportunity to make donations. In some embodiments, if funding has been triggered, then the presentation module 210 and/or the tracking module 212 may send a notification to a financial institution to transfer money from trust to one or more entities as per the requirements of the one or more sponsors. In various embodiments, if funding has been triggered, then the presentation module 210 and/or the tracking module 212 may provide money from trust store door accounted for by the service intelligence system 1022 the one or more entities.

In some embodiments, the service intelligence system 102 may generate agreements based on agreement templates between volunteers, those associate with service opportunities, and sponsors. Information from the service opportunities (e.g., work to be performed, when the work is to be performed, and the like), volunteers (e.g., volunteer identification information and contact information), and sponsors (e.g., amount of money to be donated, destination of donation, and conditions to trigger donations) may be used to complete the agreement. The service intelligence system 102 may provide the agreement two contacts associated with service opportunities, volunteers, and sponsors for their signatures and/or agreement. The agreement may be saved in the data store 220.

Figure 6:
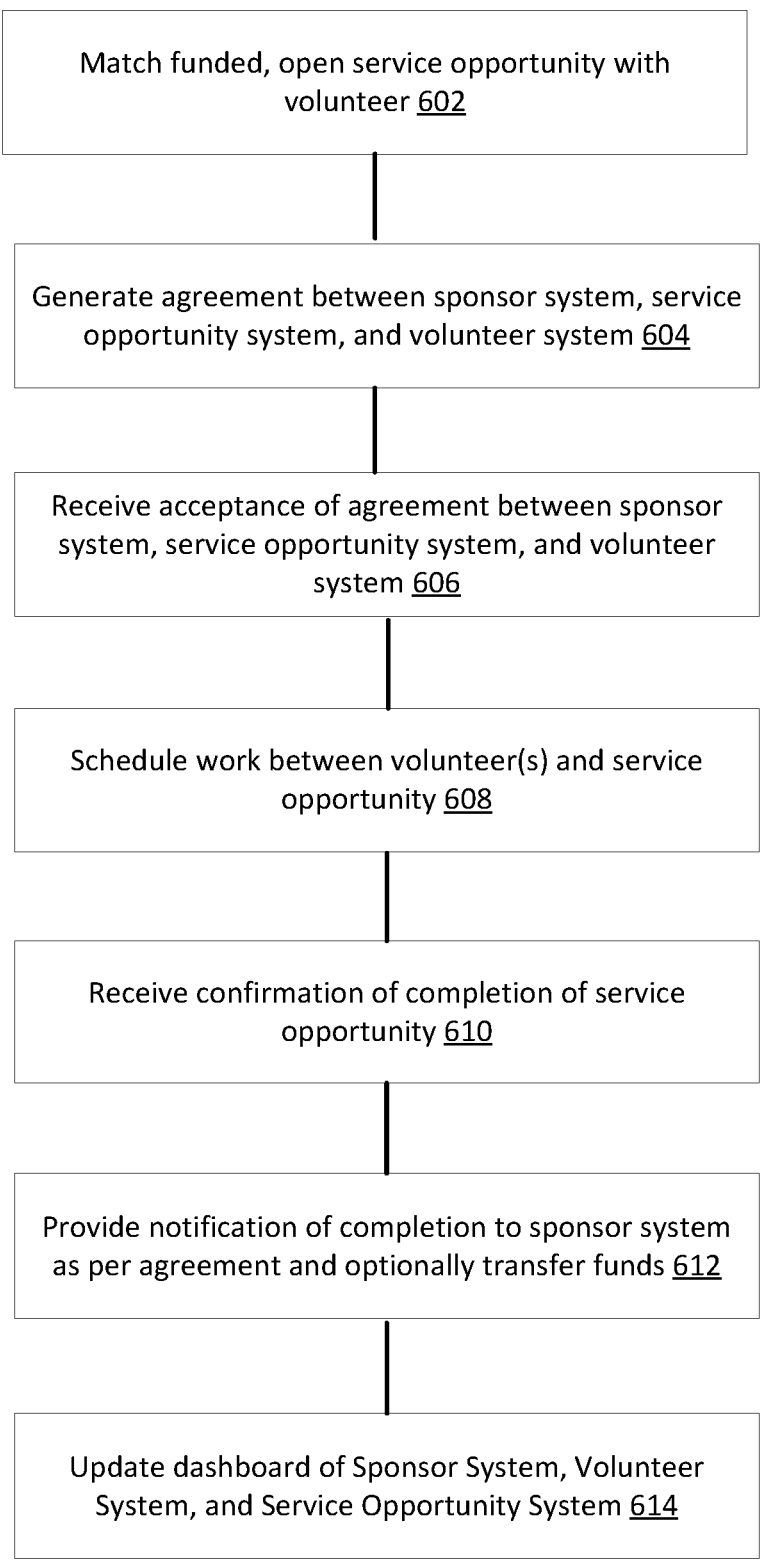
FIG. 6 is an example method for creating and executing agreements between volunteers, service opportunities, and sponsors in some embodiments.

FIG. 6 is an example method for creating and executing agreements between volunteers, service opportunities, and sponsors in some embodiments. In step 602, the control module 214 matches funded, open service opportunities with volunteers. Examples of been discussed herein. In step 604, an optional agreement module (not shown) of the service intelligence system 102 may generate agreement between a sponsor system, service opportunity system, and a volunteer system. As discussed herein, an optional agreement module may generate an agreement between volunteers, sponsors, and those associated with one or more service opportunities. The optional agreement module may retrieve agreement templates from the data store 220. In some embodiments, the agreement template may be selected based on a particular volunteer, a particular sponsor, and/or a specific service opportunity. The optional agreement module may complete a retrieved agreement template using information from the volunteer(s), sponsor(s), and/or those associated with the service opportunity. The optional agreement module may request additional information from the volunteer(s), sponsor(s), and/or those associated with the service opportunity. The optional agreement module may, once the agreement is complete, provide copies of the agreement to the volunteer(s), sponsor(s), and/or those associated with the service opportunity for agreement and/or confirmation.

In step 606, the optional agreement module may receive an indication of acceptance of the agreement between the sponsor system, service opportunity system, and volunteer system. The agreement may be stored in the data store 220.

In step 608, the communication module 202 may schedule work between volunteers and those associated with the service opportunity. For example, the communication module 202 may share contact information between volunteers and/or with those associated with the service opportunity. In some embodiments, the service intelligence system 102 may include calendar functions that enable volunteers to sign up for a particular service opportunity and associate their volunteer work for times and dates. The service intelligence system 102 may track those times and dates and provide them back to the volunteers as needed and/or provide times and dates to those associated with the service opportunity. This may allow for volunteer work to be organized and orchestrated as needed.

In step 610, the tracking module 212 may receive confirmation of completion of the service opportunity. In various embodiments, the communication module 202 may receive an indication of tasks or were completed from those associated with the service opportunity and/or volunteers. The communication module 202 may inform the tracking module 212 is the tracking module 212 keeps track of tasks and work that has been completed.

Once tests and/or the work is been completed, the communication module 202 may provide a notification of completion to a sponsor system as per the agreement in step 612. As discussed herein, in some embodiments, the service intelligence system 102 may provide funds are donations as per the agreement to the benefiting entities or provide notification to a financial institution to provide such funds.

In step 614, the service intelligence system 102 may updated a dashboard for the sponsor system, the volunteer system, and make service opportunity system. In one example, the service intelligence system 102 may update a volunteer dashboard to indicate the service opportunities that the volunteer work, sponsors involved including how much they donated based on the volunteer's work, other volunteers they worked with, other contacts associated with the service opportunity, number of hours they worked, specialty work that they performed, quality of work (e.g., which may be provided by the analysis module 218), and the like. In some embodiments, the service intelligence system 102 may enable volunteers to share all or part of their dashboards with other volunteers or other volunteers of their particular group.

In various embodiments, the service intelligence system 102 may enable the volunteers to compete each other based on number of hours, number of projects involved, and the like. The service intelligence system 102 may provide a leaderboard of the top so many volunteers of the system, of a particular service opportunity, of a group project, and the like. The leaderboard may appear on the volunteer's dashboard, sponsor's dashboard, dashboard associated with the service opportunity, and/or on a website associate with the service intelligence system 102. Will be appreciated that there may be many ways to gamify the system to encourage volunteers to help those in need.

A sponsor dashboard may include amounts donated in total over a period of time, amounts donated to specific entities, service projects that of been sponsored, upcoming service projects that have been sponsored, task completed of existing work projects, volunteers or employees associate with the sponsor, and/or the like. The sponsor dashboard may also include an amount in trust and any trigger events that would trigger payment.

The service opportunity dashboard may include a dashboard for all work performed at that particular service opportunity, task completed, volunteers working on the project, the schedule, donations to be provided, and/or the like.

In various embodiments, volunteers may be able to reach each other during or after the task or service opportunity. Ratings may be made on a scale may be available over the graphical user interface of the service intelligence system 102. Volunteers may rank each other in terms of performance, ability to work as a team and the like. Similarly, those associated with a service opportunity may be older rank each volunteer or groups of volunteers based on performance or any number of criteria. Rankings may be stored in volunteer records and displayed in dashboards and or within a card or graphical user interface provided by the service intelligence system 102 for those who are searching for volunteers. In some embodiments part of a query may include ratings for volunteers to assist in the search for qualified and skilled volunteers.

Similarly, volunteers may be able to rank or provide a score for those associated with service opportunities. Those people or pleasant to work with and/or are easy to work with may be ranked more highly than those in need or difficult. Ranking your scores may be stored in service opportunity records or records associated with those associated with service opportunities. Rankings may be displayed in dashboards and or within a card or graphical user interface provided by the service intelligence system 102 for those who are searching for possible service opportunities. In some embodiments part of a query may include ratings for those associated with service opportunities to assist in the search for future service opportunities.

Although a system involving sponsors, volunteers, and service opportunities is discussed, it will be appreciated that there may be other interested entities that work with the service intelligence system. For example, a plurality of people could owe a city, such as Oakland, Calif., fees or fines. If one or more of these people could not pay the fee or fine (e.g., without depriving themselves or their families with necessities), the city may choose to allow them to provide volunteer service to satisfy the fee or fine. The service intelligence system 102 may generate a dashboard or report identifying people who choose to volunteer their time and service in lieu of payment of fines and fees. The service intelligence system 102 may allow the people to search for and commit to one or more service opportunities. The service intelligence system 102 may then track their work and performance. The service intelligence system 102 may calculate or trigger satisfaction of all or part of the fines or fees and provide status updates to the people and the city. In some embodiments, a sponsor may choose to pay the people's fines or fees to the city in exchange for their volunteer work. In this example, the city does not forgive fines or fees, but may receive payment from the sponsor.

In some embodiments, the service intelligence system 102 may utilize a crypto token or a crypto coin. The crypto coin may represent a donation offered that targets specific volunteerism, where the participants agree that when the token is redeemed towards a qualified charity, that they will fulfill the terms of the agreement. In effect, a tokenized version of a legal contract.

As fuel for a blockchain that publicly records the multi-participant agreements that benefit a charity and comprise of a sponsor and a volunteer. The blockchain may create an immutable record of the agreement and the execution of the agreement and a crypto coin is used to fuel the recordation of the information in a public blockchain that can be viewed by the public and easily audited at any time.

Figure 7:
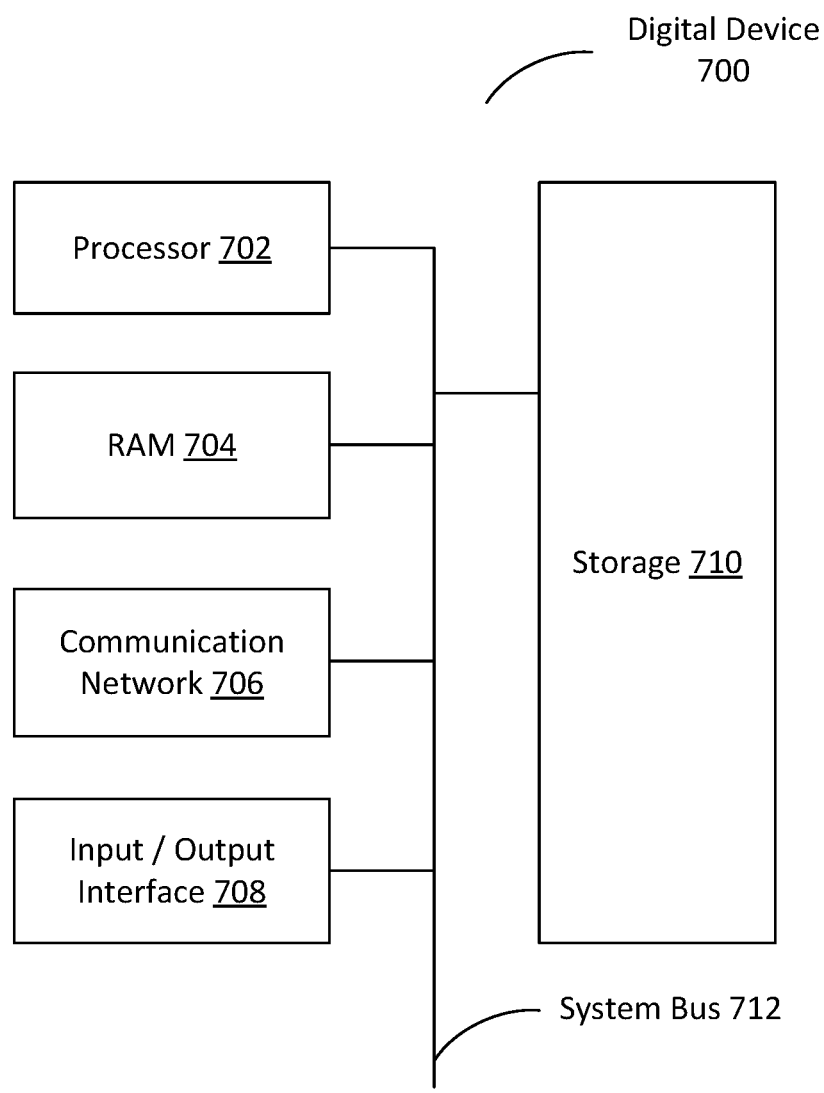
FIG. 7 depicts a block diagram of an example computing device according to some embodiments.

FIG. 7 depicts a block diagram of an example computing device 702 according to some embodiments. Computing device 702 comprises a processor 704, a memory 706, a storage 708, an input device 710, a communication network interface 712, and an output device 714. Processor 704 is configured to execute executable instructions (e.g., programs). In some embodiments, the processor 704 comprises circuitry or any processor capable of processing the executable instructions.

Memory 706 stores data. Some examples of memory 706 include storage devices, such as RAM, ROM, RAM cache, virtual memory, etc. In various embodiments, working data is stored within memory 706. The data within memory 706 may be cleared or ultimately transferred to storage 708.

Storage 708 includes any storage configured to retrieve and store data. Some examples of storage 708 include flash drives, hard drives, optical drives, and/or magnetic tape. Each of memory system 706 and storage system 708 comprises a computer-readable medium, which stores instructions or programs executable by processor 704.

The input device 710 is any device that inputs data (e.g., mouse, keyboard, stylus). Output device 714 outputs data (e.g., speaker, display, virtual reality headset). It may be appreciated that storage 708, input device 710, and output device 714 may be optional. For example, routers/switches may comprise processor 704 and memory 706 as well as a device to receive and output data (e.g., the communication network interface 712 and/or the output device 714).

A communication network interface 712 may be coupled to a network (e.g., communication network 108) via communication network interface 712. Communication network interface 712 may support communication over an Ethernet connection, a serial connection, a parallel connection, and/or an ATA connection. Communication network interface 712 may also support wireless communication (e.g., 802.11 a/b/g/n, WiMax, LTE, WiFi). It may be apparent that the communication network interface 712 may support many wired and wireless standards.

The output device 714 outputs data (e.g., speaker, display, virtual reality headset). It may be appreciated that the storage 708, input device 710, and output device 714 may be optional. For example, routers/switches may comprise processor 704 and memory 706 as well as a device to receive and output data (e.g., the communication network interface 712 and/or the output device 714).

A module or engine may be hardware or software. In some embodiments, the module or engine may configure one or more processors to perform functions associated with the module or engine. Although different module or engine are discussed herein, it may be appreciated that the virtual assistant system 110 may include any number of modules or engines performing any or all functionality discussed herein.

The invention claimed is:

1. A non-transitory computer readable medium comprising instructions executable by a processor, the instructions being executable to perform a method, the method comprising:
   receiving, from a volunteer system, volunteer information via a volunteer dashboard of the volunteer system;
   receiving from a plurality of unrelated service opportunity systems service opportunity information regarding a plurality of upcoming service opportunities, the plurality of unrelated service opportunity systems being remote from each other and the volunteer system;
   generating a query based on at least some of the volunteer information to identify one or more service opportunities from the service opportunity information;
   searching, using the query based on at least some of the volunteer information, to identify the one or more service opportunities from the service opportunity information;
   providing, to the volunteer dashboard of the volunteer system, a first list of service opportunities based on the one or more service opportunities that were identified based on the search;
   receiving, from the volunteer system, a selection of a service opportunity from the first list of service opportunities;
   scheduling a volunteer associated with the volunteer system for service associated with the selected service opportunity;

notifying at least one of the unrelated service opportunity systems associated with the selected service opportunity via a service opportunity dashboard of the at least one of the unrelated service opportunity system;

receiving, in real-time, an indication of completion of the selected service opportunity and an indication of the volunteer's participation in the selected service opportunity;

updating, in real-time, a volunteer record associated with the volunteer; and providing in real-time, to the volunteer dashboard, the updated volunteer record thereby providing a centralized system for volunteer systems and service opportunity systems.

2. The non-transitory computer readable medium of claim 1, further comprising:

receiving a search query from a first sponsor system associated with a first sponsor;

searching the information regarding a plurality of upcoming service opportunities based on the search query from the first sponsor system;

providing to the first sponsor system a second list of service opportunities based on the one or more service opportunities that were identified based on the search;

receiving, from the first sponsor system, a selection of the service opportunity from the second list of service opportunities;

receiving first sponsor conditions that trigger a donation based on the selected service opportunity;

receiving an indication of completion of the selected service opportunity; and providing an indication of the donation based on performance associated with the selected service opportunity to the first sponsor system.

3. The non-transitory computer readable medium of claim 1, wherein generating the query based on at least some of the volunteer information to identify the one or more service opportunities from the service opportunity information comprises retrieving the at least some of the volunteer information from a stored volunteer record associated with the volunteer and generating the query based on the retrieved the at least some of the volunteer information form the stored volunteer record.

4. The non-transitory computer readable medium of claim 2, further comprising receiving funds from the first sponsor system and paying the donation to a third-party remote from the first sponsor system and the volunteer system based on completion or partial completion of the selected service opportunity.

5. The non-transitory computer readable medium of claim 4, wherein the third-party is a non-profit organization.

6. The non-transitory computer readable medium of claim 2, further comprising:

receiving a search query from a second sponsor system associated with a second sponsor;

searching the information regarding any number of the plurality of upcoming service opportunities based on the search query from the second sponsor system, the search query from the second sponsor system limiting the search to those service opportunities that already have at least one sponsor;

providing to the second sponsor system a third list of service opportunities based on the one or more service opportunities that were identified based on the search;

receiving, from the sponsor system, a selection of the service opportunity from the third list of service opportunities;

receiving sponsor conditions that trigger a matching donation based on the selected service opportunity;

receiving an indication of the donation of the first sponsor; and providing an indication of the matching donation triggered by the donation of the first sponsor to the second sponsor system.

7. The non-transitory computer readable medium of claim 1, wherein the query based on at least some of the volunteer information to identify one or more service opportunities from the service opportunity information includes a limitation for service opportunities with at least one sponsor.

8. The non-transitory computer readable medium of claim 1, the method further comprising generating a dashboard and providing the dashboard to an employer that employees a plurality of volunteers, where the dashboard indicates which volunteer of the plurality of volunteers has worked on particular service opportunities.

9. The non-transitory computer readable medium of claim 8, further the dashboard includes notifications of upcoming service opportunities that may be available and of interest to all or one of the plurality of volunteers.

10. The non-transitory computer readable medium of claim 1, wherein the query based on the at least some of the volunteer information to identify the one or more service opportunities from the service opportunity information includes a limitation indicating a specific requirement that may be satisfied by the volunteer associated with the volunteer system.

11. A service intelligence system comprising:

at least one processor;

a network interface to communicate over a network; and memory, the memory including instructions to control the at least one processor to:

receive, from a volunteer system remote to the service intelligence system, volunteer information via a volunteer dashboard of the volunteer system;

receive, from a plurality of unrelated service opportunity systems remote to the service intelligence system, service opportunity information regarding a plurality of upcoming service opportunities, the plurality of unrelated service opportunity systems being remote from each other and the volunteer system;

generate a query based on at least some of the volunteer information to identify one or more service opportunities from the service opportunity information;

search, using the query based on at least some of the volunteer information, to identify the one or more service opportunities from the service opportunity information;

provide, to the volunteer dashboard of the volunteer system, a first list of service opportunities based on the one or more service opportunities that were identified based on the search;

receive, from the volunteer system, a selection of a service opportunity from the first list of service opportunities;

schedule a volunteer associated with the volunteer system for service associated with the selected service opportunity;

notify at least one of the unrelated service opportunity systems associated with the selected service opportunity via a service opportunity dashboard of the at least one of the unrelated service opportunity system;

receive, in real-time, an indication of completion of the selected service opportunity and an indication of the volunteer's participation in the selected service opportunity;

update, in real-time, a volunteer record associated with the volunteer; and provide in real-time, to the volunteer dashboard, the updated volunteer record, thereby providing a centralized system for volunteer systems and service opportunity systems.

12. The service intelligence system of claim 11, the instructions further control the at least one processor to further:

receive a search query from a first sponsor system associated with a first sponsor;

search the information regarding a plurality of upcoming service opportunities based on the search query from the first sponsor system;

provide to the first sponsor system a second list of service opportunities based on the one or more service opportunities that were identified based on the search;

receive, from the first sponsor system, a selection of the service opportunity from the second list of service opportunities;

receive first sponsor conditions that trigger a donation based on the selected service opportunity;

receive an indication of completion of the selected service opportunity; and provide an indication of the donation based on performance associated with the selected service opportunity to the first sponsor system.

13. The service intelligence system of claim 11, wherein generate the query based on at least some of the volunteer information to identify the one or more service opportunities from the service opportunity information comprises retrieve the at least some of the volunteer information from a stored volunteer record associated with the volunteer and generating the query based on the retrieved the at least some of the volunteer information form the stored volunteer record.

14. The service intelligence system of claim 12, the instructions further control the at least one processor to receive funds from the first sponsor system and paying the donation to a third-party remote from the first sponsor system and the volunteer system based on completion or partial completion of the selected service opportunity.

15. The service intelligence system of claim 14, wherein the third-party is a non-profit organization.

16. The service intelligence system of claim 12, the instructions further control the at least one processor to:

receive a search query from a second sponsor system associated with a second sponsor;

search the information regarding any number of the plurality of upcoming service opportunities based on the search query from the second sponsor system, the search query from the second sponsor system limiting the search to those service opportunities that already have at least one sponsor;

provide to the second sponsor system a third list of service opportunities based on the one or more service opportunities that were identified based on the search;

receive, from the sponsor system, a selection of the service opportunity from the third list of service opportunities;

receive sponsor conditions that trigger a matching donation based on the selected service opportunity;

receive an indication of the donation of the first sponsor; and provide an indication of the matching donation triggered by the donation of the first sponsor to the second sponsor system.

17. The service intelligence system of claim 11, wherein the query based on at least some of the volunteer information to identify one or more service opportunities from the service opportunity information includes a limitation for service opportunities with at least one sponsor.

18. The service intelligence system of claim 11, the instructions further control the at least one processor to generate a dashboard and providing the dashboard to an employer that employees a plurality of volunteers, where the dashboard indicates which volunteer of the plurality of volunteers has worked on particular service opportunities.

19. The service intelligence system of claim 18, further the dashboard includes notifications of upcoming service opportunities that may be available and of interest to all or one of the plurality of volunteers.

20. The service intelligence system of claim 11, wherein the query based on the at least some of the volunteer information to identify the one or more service opportunities from the service opportunity information includes a limitation indicating a specific requirement that may be satisfied by the volunteer associated with the volunteer system.

* * * * *